(12) United States Patent
Pangle et al.

(10) Patent No.: US 12,341,747 B1
(45) Date of Patent: Jun. 24, 2025

(54) SELF-SERVICE MANAGEMENT OF NETWORK ADDRESS ALLOCATIONS IN A CLOUD PROVIDER NETWORK

(71) Applicant: Amazon Technologies, Inc., Seattle, WA (US)

(72) Inventors: Jonathan Louis Pangle, Seattle, WA (US); Jonathan Paul Kramer, Arlington, VA (US); Besan Abu Radwan, Ashburn, VA (US); Neha Mohan Tilak, Lynnwood, WA (US); Dennis So Ting Fong, Vienna, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 96 days.

(21) Appl. No.: 18/475,882

(22) Filed: Sep. 27, 2023

(51) Int. Cl.
*H04L 61/5061* (2022.01)
*H04L 45/748* (2022.01)
*H04L 61/251* (2022.01)

(52) U.S. Cl.
CPC ........ *H04L 61/5061* (2022.05); *H04L 45/748* (2013.01); *H04L 61/251* (2013.01)

(58) Field of Classification Search
CPC .. H04L 61/5061; H04L 45/748; H04L 61/251
See application file for complete search history.

(56) References Cited

U.S. PATENT DOCUMENTS

| | | | | |
|---|---|---|---|---|
| 9,923,865 B1* | 3/2018 | Wei | ............... | H04L 61/2514 |
| 10,965,641 B2* | 3/2021 | Tsirkin | .............. | G06F 9/4856 |
| 11,159,344 B1* | 10/2021 | Shevade | ............... | H04L 45/033 |
| 11,595,347 B1* | 2/2023 | Shevade | ............ | H04L 61/2514 |
| 2011/0238793 A1* | 9/2011 | Bedare | ............... | H04L 61/5061 709/224 |
| 2011/0258343 A1* | 10/2011 | Kettunen | ............ | H04L 61/5061 709/245 |
| 2011/0282998 A1* | 11/2011 | Johnsson | ................ | H04L 69/40 709/226 |
| 2014/0172947 A1* | 6/2014 | Ghai | ..................... | H04L 65/102 709/202 |
| 2015/0049637 A1* | 2/2015 | Kuusisaari | .......... | H04L 61/5061 370/254 |
| 2020/0186494 A1* | 6/2020 | X | ........................ | H04L 41/0886 |
| 2021/0099532 A1* | 4/2021 | Goel | .................. | H04L 67/1001 |

\* cited by examiner

*Primary Examiner* — El Hadji M Sall
(74) *Attorney, Agent, or Firm* — Perilla Knox & Hildebrandt LLP; Thomas B. Hildebrandt

(57) ABSTRACT

Disclosed are various embodiments for self-service management of network address allocations in a cloud provider network. In one embodiment, a first network address pool is created for a customer of a cloud provider network in response to a first request. A second network address pool is internally reserved for the customer, where the second network address allocation is contiguous to the first network address pool. The first network address pool is expanded to include at least a portion of the second network address pool in response to a second request.

20 Claims, 6 Drawing Sheets

SELF-SERVICE MANAGEMENT OF NETWORK ADDRESS ALLOCATIONS IN A CLOUD PROVIDER NETWORK

BACKGROUND

Network addresses for the Internet are specified in respective addressing schemes for Internet Protocol version 4 (IPv4) and Internet Protocol version 6 (IPv6). IPv4 addresses are 32 bits in length and are usually visually represented by dotted quad notation, with four octets, each ranging from 0 to 255 and separated by periods. There are roughly 232 or 4,294,967,296 addresses, less reserved and/or system address ranges. The use of Classless Inter-Domain Routing (CIDR) allowed for allocation of addresses using variable length subnet masks and accompanying arbitrary length network prefixes. For example, a network "192.168.1.0/24" indicates a network prefix 24 bits in length using CIDR notation, with the equivalent subnet mask of "255.255.255.0" being implied by the "/24" CIDR notation. While four billion addresses may seem like a large number, every top-level block of IPV4 addresses has already been allocated. Because of IPV4 address exhaustion, the Internet is transitioning to the use of IPV6, which uses 128-bit addresses and 2128 possible addresses. IPV6 addresses are represented as eight groupings of four hexadecimal digits, each ranging from 0000 to ffff, and separated by colons.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
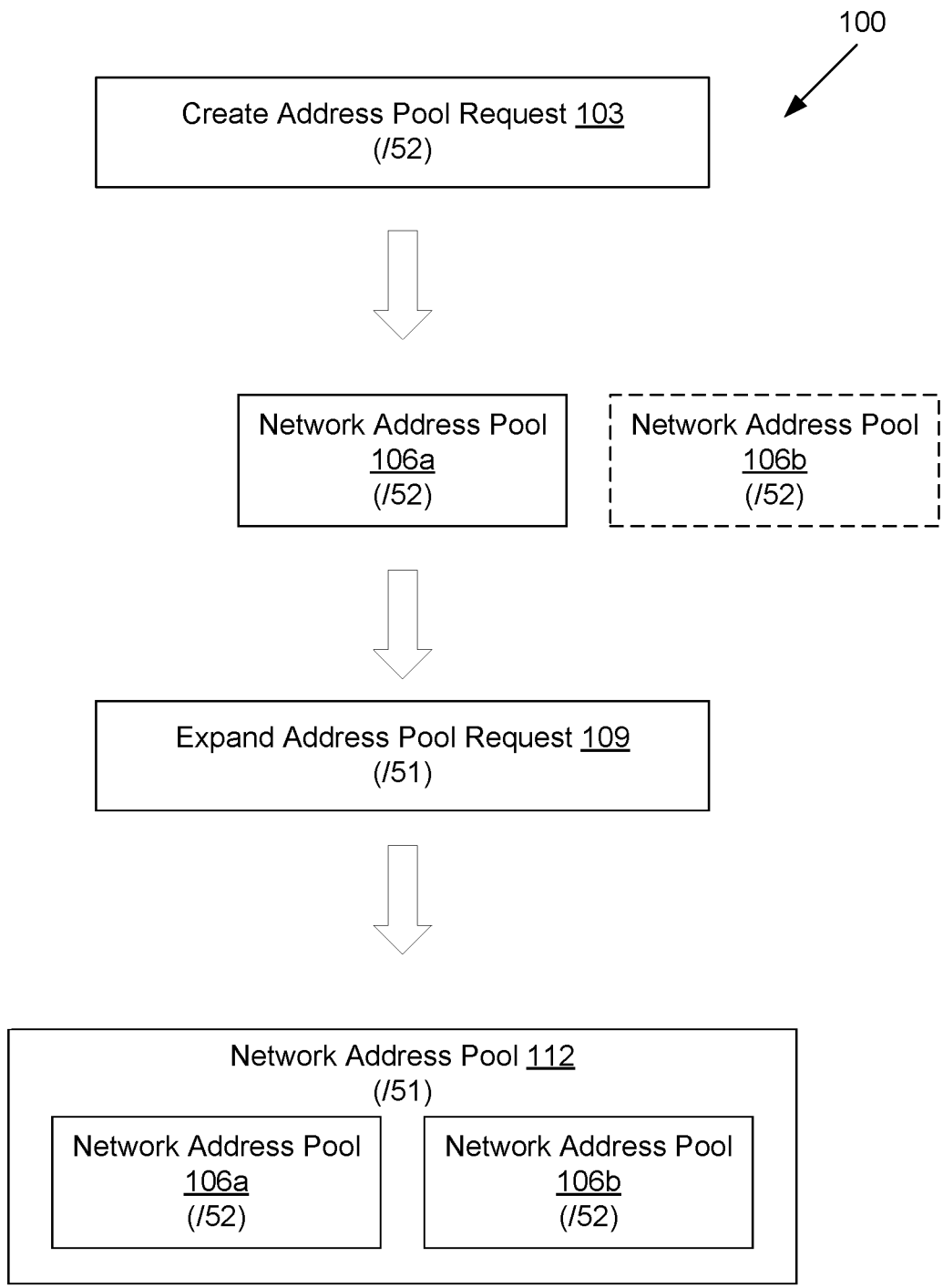
FIGS. 1A and 1B are drawings of example usage scenarios involving a self-service network address allocation management system according to various embodiments of the present disclosure.

The present disclosure relates to self-service management of network address allocations in a cloud provider network. Organizations that manage networking infrastructure may need to keep track of network address allocations in order to know what address ranges are already allocated, or conversely, are unallocated and available for allocation. In various scenarios, a customer may be seeking a new network address allocation with at least a certain number of network addresses to configure a subnetwork in a cloud provider network, where the addresses are allocated from a pool of available addresses from the cloud provider or from a pool of addresses that the customer already controls. Using CIDR notation, the "/X" number of bits subtracted from the number of bits in the address yields the number of addresses available in a network according to the formula 2 (32-X) for IPV4 or 2 (128-X) for IPV6. For example, a request for a "/28" network allocation in IPV4 would be for 2 (32-28) or 16 contiguous addresses.

Customer resources or hosts on a cloud provider network are assigned network addresses (IPv4 and/or IPV6) in order to communicate with one another and with other resources or hosts on the cloud provider network. For example, when a customer creates a first virtual private cloud (VPC) network, a first allocation of network addresses may be randomly allocated. When the customer subsequently creates a second VPC network, a second allocation of network addresses may be randomly allocated. These random allocations prevent customers from pre-planning their network address numbering. The first and second allocations may be non-contiguous, which may pose problems and interfere with unified management of hosts on the first and second allocations. For example, non-contiguous network address allocations would force customers to create individual static routes, security groups, access control lists, and firewalls for each function in their respective table.

It is also important to avoid unnecessary fragmentation of larger network address blocks to preserve them for customers who may require such larger allocations. To illustrate, within a "/30" block of four contiguous addresses in IPV4 are two "/31" blocks of two contiguous addresses each. Allocating a single address from the first "/31" block and a single address from the second "/31" block would make it impossible to allocate an entire "/31" block of two addresses. Thus, an allocation management system should seek to allocate both single addresses (each considered "/32" blocks) within one "/31" block, thus preserving the entire remaining "/31" block for a possible future allocation request of two contiguous addresses.

Various embodiments of the present disclosure introduce approaches for self-service management of network address allocations. When a customer receives a network address allocation, functionality is provided to enable the customer to fully manage that allocation, including, for example, splitting the allocation into multiple blocks, resizing an allocation, combining one allocation with another, and so forth. This enables customers to be in control of the network addresses assigned for their use on the cloud provider network. With sequential numbering, customers can easily summarize the network addresses of their VPCs by team, function, application, and so on. Additionally, additional contiguous allocations may be reserved on behalf of the customer when a first allocation is provided, which enables the customer to expand into contiguous address space if needed at a later time. In some embodiments, when a customer releases a network address allocation, that allocation may remain unavailable for other customers for a period of time in which the released allocation may be reallocated to the customer.

As one skilled in the art will appreciate in light of this disclosure, certain embodiments may be capable of achieving certain advantages, including some or all of the following: (1) improving the functioning and security of computer networks through the use of a cooling period for released network address allocations, so that customers are not cycling through different network address allocations; (2) improving the functioning of computer networks by enabling network address allocations to be expanded into contiguous space that is reserved for the customer; (3) improving the functioning of computer networks by enabling customers of a cloud provider network to manage their own network address allocations in a self-service way to meet the needs of their organizations' computer systems; and so forth.

With reference to FIG. 1A, shown is one example of a usage scenario 100 of a self-service network address allocation management system according to various embodiments. In the usage scenario 100, a customer of a cloud provider submits a request 103 to create a network address pool for use on the cloud provider network operated by the cloud provider. For example, the request may specify a target region of the cloud provider network and a desired number of addresses. The desired number of addresses may be specified in CIDR notation, e.g., ("/52"). The request may also specify whether the network addresses are to be IPv4, IPv6, or another type of network address.

In response, the system creates the requested network address pool 106a, including a block of network addresses corresponding to the requested "/52" size. In addition, the system internally reserves contiguous network address space, corresponding to the network address pool 106b. In this non-limiting example, the network address pool 106b is of the same size as the network address pool 106a (namely, "/52" in CIDR notation), but different sizes may be used. In some cases, that the network address pool 106b is internally reserved may be unknown to the customer. The customer is able to allocate and manage address blocks from the network address pool 106a, such as allocating address blocks to one or more virtual private cloud networks of the customer on the cloud provider network.

However, the customer may exhaust the network address space provided by the network address pool 106a. Different customers may have different network address needs, and those needs may vary over time. Consequently, the customer may submit a request 109 to expand the network address pool 106a, or to allocate an additional network address pool, to expand the network address space that is available to be allocated. In response, the system may create a network address pool 112 that includes both the network address pool 106a and the network address pool 106b, which are contiguous to one another. This provides a network prefix length of 51 bits, or a network of size "/51" in CIDR notation, and both the network address pool 106a and the network address pool 106b can be managed easily as one network or sub-network if desired.

Figure 1B:
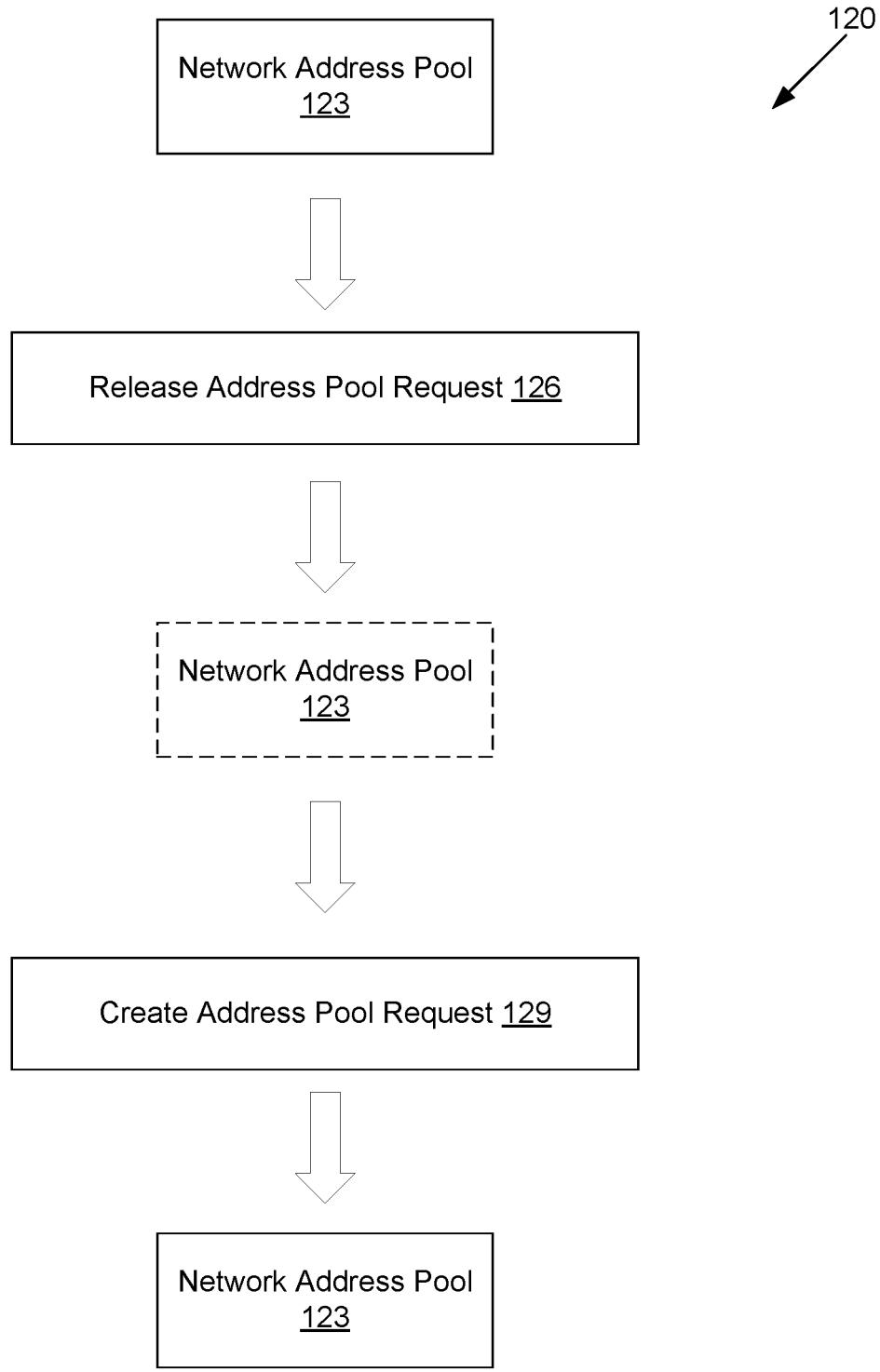

Turning now to FIG. 1B, shown is one example of a usage scenario 120 of a self-service network address allocation management system according to various embodiments. To begin with, a customer of a cloud provider operating a cloud provider network may be assigned a network address pool 123. The customer may decide that the network address pool 123, or a portion thereof, is no longer needed and may submit a release network address pool request 126. In response to the request, the network address pool 123 (or portion thereof) may be placed in a state in which is not assigned to the customer but is internally reserved for the customer for a period of time. When internally reserved, the network address pool 123 is not available to be assigned to or used by another customer.

Subsequently, the customer may submit another network address pool creation request 129. The request may specify a size that is the same as or different from the previously allocated network address pool 123. Rather than assigning different address space, and allowing a customer to cycle through many different network addresses, the previously assigned address space is used to create the network address pool 123. In some cases, the previous address space may be insufficient to fulfill the request, in which case different address space may be assigned. In the following discussion, a general description of the system and its components is provided, followed by a discussion of the operation of the same.

Figure 2:
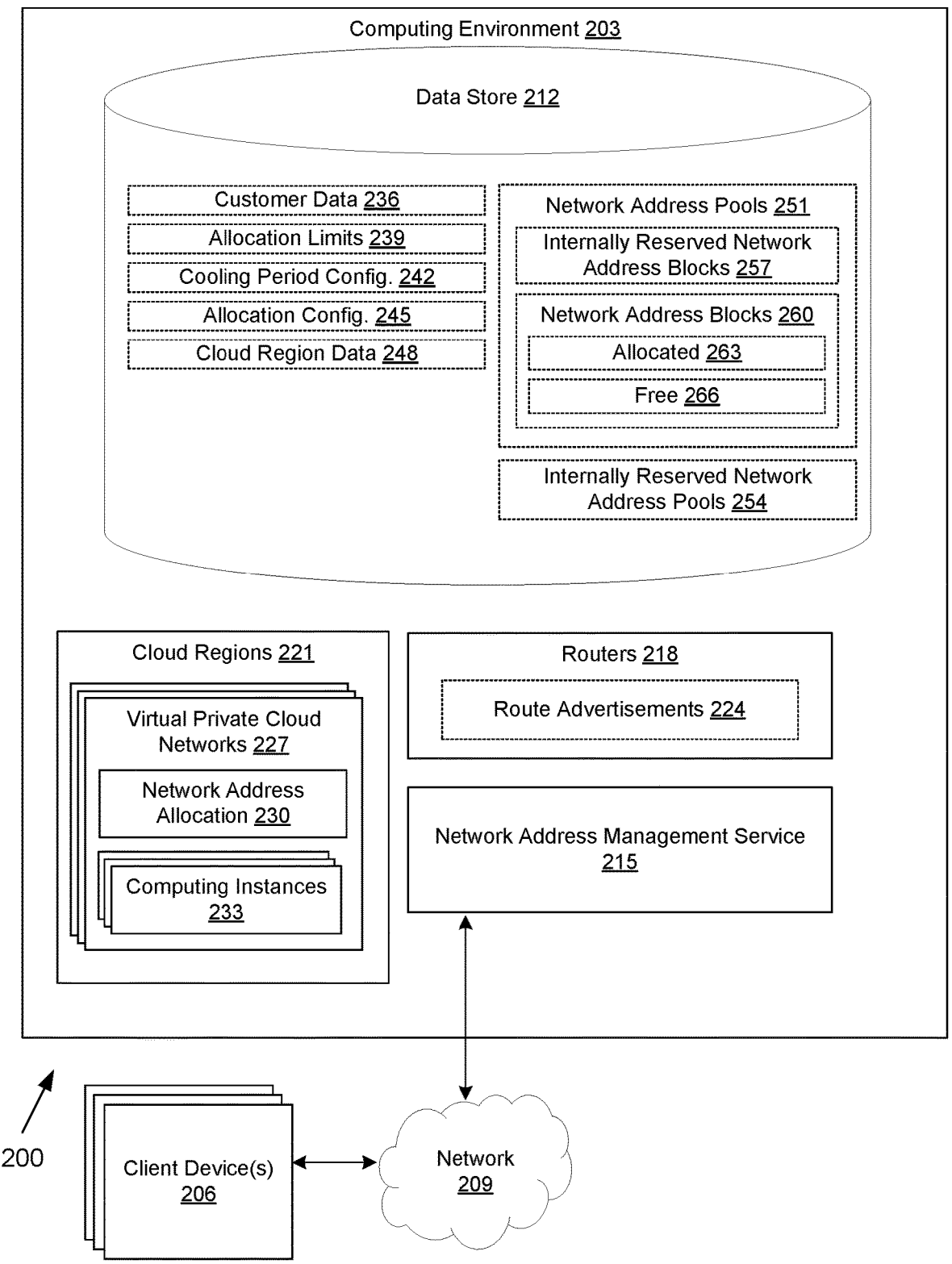
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209 The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

The computing environment 203 may implement a cloud provider network operated by a cloud provider. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network can provide on-demand, scalable computing services to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and preloaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

A cloud provider network can be formed as a number of regions, where each region represents a geographical area in which the cloud provider clusters data centers. Each region can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one another such that a same natural disaster (or other failure-inducing event) should not affect or take more than one AZ offline at the same time. Customers can connect to an AZ of the cloud provider network via a publicly accessible network (e.g., the Internet, a cellular communication network).

Transit Centers (TC) are the primary backbone locations linking customers to the cloud provider network and may be co-located at other network provider facilities (e.g., Internet service providers, telecommunications providers). Each region can operate two or more TCs for redundancy.

The parenting of a given edge location to an AZ or region of the cloud provider network can be based on a number of factors. One such parenting factor is data sovereignty. For example, to keep data originating from a communication network in one country within that country, the edge locations deployed within that communication network can be parented to AZs or regions within that country. Another factor is availability of services. For example, some edge locations may have different hardware configurations such as the presence or absence of components such as local non-volatile storage for customer data (e.g., solid state drives), graphics accelerators, etc. Some AZs or regions might lack the services to exploit those additional resources, thus, an edge location could be parented to an AZ or region that supports the use of those resources. Another factor is the latency between the AZ or region and the edge location. While the deployment of edge locations within a communication network has latency benefits, those benefits might be negated by parenting an edge location to a distant AZ or region that introduces significant latency for the edge location to region traffic. Accordingly, edge locations are often parented to nearby (in terms of network latency) AZs or regions.

The cloud provider network can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network, for example it may not be possible to route from a substrate network address to an address in a production network that runs services of the cloud provider, or to a customer network that hosts customer resources.

The cloud provider network can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components of the computing environment 203, for example, include a network address management service 215, one or more routers 218, one or more cloud regions 221, and other applications, services, processes, systems, engines, or functionality not discussed in detail herein. The network address management service 215 is executed to facilitate self-service management of network address allocations by customers on a cloud provider network. The network address management service 215 may provide user interfaces such as a command-line interface and/or a graphical user interface to receive commands and provide responsive information. The network address management service 215 may also provide application programming interfaces (APIs) to enable other components to interact with the network address management service 215 programmatically. As part of the management functionality, the network address management service 215 may enable creating network address pools, expanding network address pools, releasing network address pools, allocating blocks of network addresses from network address pools, reallocating blocks of network addresses, releasing blocks of network addresses, combining blocks of network addresses, splitting blocks of network addresses, and/or other management functions.

In various embodiments, the network address management service 215 may use structures such as prefix allocation trees and/or other functionality as described by U.S. Pat. No. 11,356,409, entitled "NETWORK ADDRESS ALLOCATION MANAGEMENT USING PREFIX ALLOCATION TREES," and issued on Jun. 7, 2022, U.S. Pat. No. 11,575,647, entitled "DISTRIBUTED NETWORK ADDRESS ALLOCATION MANAGEMENT," and issued on Feb. 7, 2023, U.S. Pat. No. 11,611,529, entitled "NETWORK ADDRESS ALLOCATION MANAGEMENT USING PREFIX ALLOCATION TREES WITH ASYNCHRONOUS WORKFLOWS," and issued on Mar. 21, 2023, which are incorporated herein by reference in their entireties.

The routers 218 are employed to route data traffic between the network 209 and computing resources of the computing environment 203 and between different computing resources of the computing environment 203. The routers 218 may maintain a routing table including one or more route advertisements 224, which associate network addresses with destination or next-hop network interfaces, represented by media access control (MAC) addresses, for example. In some cases, the routers 218 may map overlay network addresses to substrate network addresses in the cloud provider network. The routers 218 may employ routing protocols such as border gateway protocol (BGP), open shortest path first (OSPF), and/or routing information protocol (RIP) to exchange routing information and receive the route advertisements 224.

The cloud provider network may be associated with a plurality of cloud regions 221. In one embodiment, a network address allocation may span only one cloud region 221 in order to simplify routing. In other embodiments, a network address allocation may span multiple regions 221.

Virtual private cloud (VPC) networks 227 of one or more customers may be in a cloud region 221. A VPC network 227 is a custom-defined, virtual network within another network, such as a cloud provider network. A VPC network 227 can provide the foundational network layer for a cloud service, for example a compute cloud or an edge cloud, or for a customer application or workload that runs on the cloud. A VPC network 227 can be defined by at least its address space, internal structure (e.g., the computing resources that comprise the VPC network 227), and transit paths. VPC network 227 resources are typically hosted and provisioned within the cloud provider network, though customer-owned networks may be connected to the VPC network 227 through a gateway. In hosting the VPC network 227, the cloud provide network implements a logical construct using physical, and optionally virtual, resources of the cloud provider network to provision the VPC network 227.

A VPC network 227 is a virtual network dedicated to a particular customer account (or set of related customer accounts, such as different customer accounts belonging to the same business organization). A VPC network 227 is logically isolated from other virtual networks in the cloud. Customers can launch resources, such as compute instances, into a VPC network 227. When creating a VPC network 227, a customer can specify a range of IPv4 and/or IPV6 addresses for the VPC network 227 in the form of a Classless Inter-Domain Routing (CIDR) block. A VPC network 227 can span all of the availability zones in a particular region. After creating a VPC network 227, a customer can add one or more subnets in each availability zone or edge location.

A VPC network 227 may have one or more access controls. Access controls can refer to security groups or network access control lists. Security groups (also known as network security groups, application security groups, cloud security groups, or compute engine firewall rules, in various implementations) act as a virtual firewall for a virtual machine instance to control inbound and outbound traffic. Customers can define security groups as policies that can be applied to specific instances. When a customer launches an instance in a VPC network 227, they can assign one or more security groups to the instance. Security groups may act at the instance level instead of the subnet level. Therefore, each instance in a subnet can be assigned to a different set of security groups. For each security group, the customer can add rules that control the inbound traffic to instances, and a separate set of rules that control the outbound traffic. Security groups can be stateful, in that return traffic is automatically allowed.

A customer can also set up network access control lists (ACLs) with rules similar to security groups in order to add an additional layer of security to a VPC network 227. Network ACLs operate at the subnet level, support allow rules and deny rules, and automatically apply to all instances in any subnet with which it is associated. Network ACLs may not be stateful, in that return traffic must be explicitly allowed by the rules.

Each VPC network 227 may be associated with a network address allocation 230 and one or more computing instances 233. The network address allocation 230 corresponds to a block of network addresses that the customer has assigned to the particular VPC network 227. Different VPC networks 227 may be assigned different size network address allocations 230. Individual network addresses may be assigned to respective computing instances 233 of the customer, so that data traffic to the respective computing instance 233 can be correctly routed using the network address.

The data stored in the data store 212 includes, for example, customer data 236, one or more allocation limits 239, a cooling period configuration 242, an allocation configuration 245, cloud region data 248, one or more network address pools 251, one or more internally reserved network address pools 254, and potentially other data.

The customer data 236 includes parameters associated with one or more accounts of a customer of the cloud provider. The parameters may include one or more characteristics that enable assessment of security risk, cloud resource demand, network address allocation demand, demand for VPC networks 227, and/or other information. These characteristics may facilitate determining a size of a network address pool 251 to be initially allocated, what changes are permissible to the network address pool 251, how many VPC networks 227 can be created, how long of a cooling period is used after a network address pool 251 is released, and so forth.

The allocation limits 239 may specify the maximum size network address pool 251 that can be assigned to a customer, or to customers meeting certain characteristics. In one scenario, a default allocation limit 239 may be used to limit the size of a network address pool 251 to a "/52" network. In another scenario, customers meeting certain criteria may be allowed to request a network address pool 251 of size "/48." The allocation limits 239 may also specify a maximum velocity of creating or modifying network address pools 251, and/or performing allocation operations with respect to the network address pools 251.

The cooling period configuration 242 may control the establishment of a cooling period during which a released network address pool 251 is internally reserved for the customer and not available for assignment to another customer. The cooling period configuration 242 may specify a predefined default cooling period, or the cooling period configuration 242 may enable the dynamic determination of a cooling period length based upon one or more characteristics of the customer in the customer data 236. For example, customers who are more likely based on their past history to release and then re-request creation of network address pools 251 may be associated with a longer cooling period than customers who release network address pools 251 and then do not create new network address pools 251 for a time period.

The allocation configuration 245 may include one or more parameters that control the operation of the network address management service 215. For example, the allocation configuration 245 may define allocation strategies, such as using prefix allocation trees, in order to promote contiguity of network address allocations and avoid fragmentation of network address allocations. The cloud region data 248 may include data describing the plurality of cloud regions 221, including the VPC networks 227 assigned to the cloud region 221, network address allocations 230 assigned to the cloud region 221, and other data.

The network address pools 251 are pools of network addresses that are issued by the cloud provider network from one or more root allocations to the cloud provider network. In one example, the network addresses correspond to publicly routable network addresses that are assigned to the cloud provider network. In another example, the network addresses correspond to internal network addresses that are routable only within the cloud provider network or a cloud region 221. A network address pool 251 corresponds to a particular set of network addresses that are assigned to a particular customer for use by that customer in the cloud provider network or to connect hosts to the resources of the customer in the cloud provider network.

A network address pool 251 may include one or more internally reserved network address blocks 257 and one or more network address blocks 260. The internally reserved network address blocks 257 correspond to network addresses adjacent to the network address pool 251 of the customer that may be predictively reserved for the customer, despite the customer not requesting the additional network address space. In some cases, the internally reserved network address blocks 257 may be reserved for the customer only for a particular time period, after which the internally reserved network address blocks 257 may be released for assignment to other customers' network address pools 251. The network address blocks 260 correspond to ranges of network addresses within the network address pool 251 that are either allocated 263 or are free 266 for future allocations by the customer. In one embodiment, a particular network address block 260 may be allocated to a VPC network 227, and then the network addresses of the network address block 260 may be assigned to individual hosts or computing instances 233 of the VPC network 227.

The internally reserved network address pools 254 may include those network address pools 251 that may have been requested to be released, but are internally reserved for a time period, namely, a cooling period. After expiration of the cooling period, the internally reserved network address pools 254 may be available for assignment to other customers of the cloud provider network.

The client device 206 is representative of a plurality of client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices.

Figure 3:
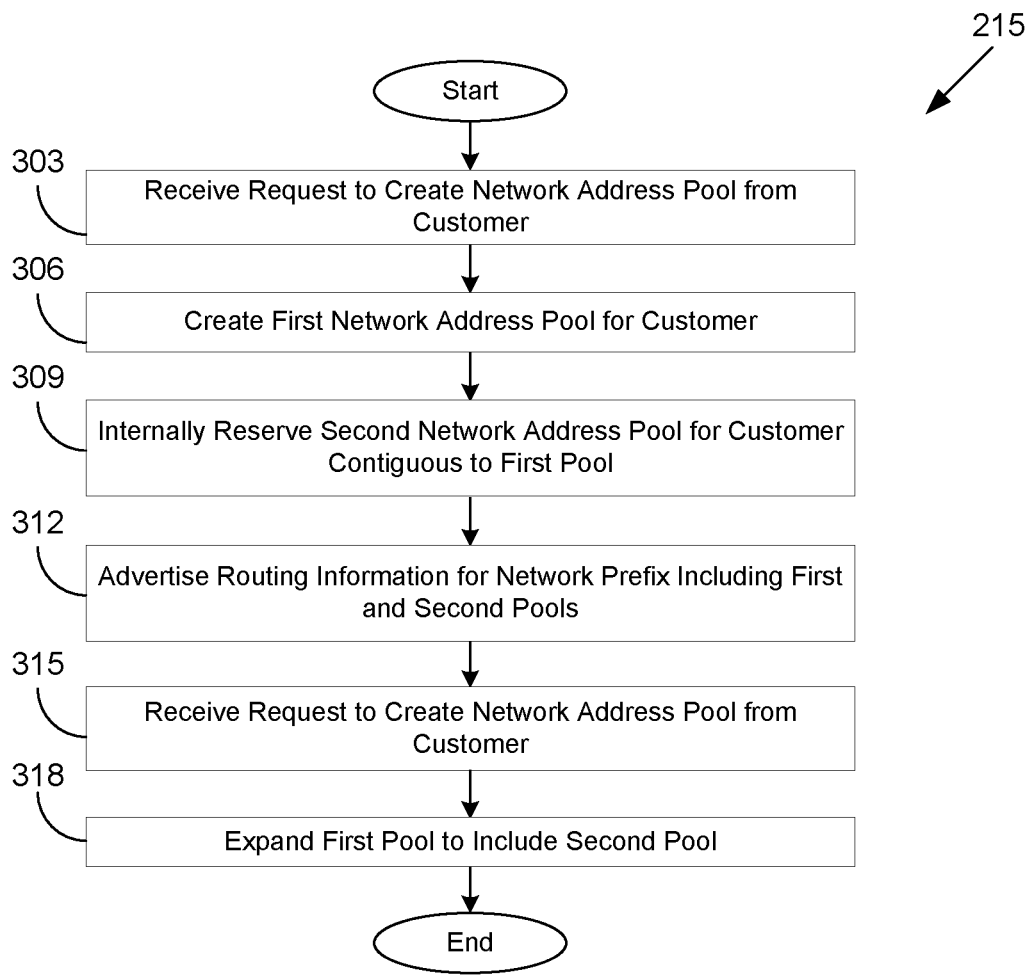
FIG. 3 is a flowchart illustrating one example of functionality implemented as portions of a network address management service executed in a computing environment in the networked environment of FIG. 2 according to various embodiments of the present disclosure.

Referring next to FIG. 3, shown is a flowchart that provides one example of the operation of a portion of the network address management service 215 according to various embodiments. It is understood that the flowchart of FIG. 3 provides merely an example of the many different types of functional arrangements that may be employed to implement the operation of the portion of the network address management service 215 as described herein. As an alternative, the flowchart of FIG. 3 may be viewed as depicting an example of elements of a method implemented in the computing environment 203 (FIG. 2) according to one or more embodiments.

Beginning with box 303, the network address management service 215 receives a request to create a network address pool 251 from a customer. For example, the request may be submitted by way of an API programmatically, or the request may be submitted by the customer through a user interface such as a command line interface or a graphical user interface using the client device 206. The request may specify a target cloud region 221 and/or the request may specify a desired size for the network address pool 251, for example, expressed in CIDR notation or network address prefix length.

In box 306, the network address management service 215 creates a first network address pool 251 for the customer. In creating the first network address pool 251, the network address management service 215 may ensure that the request complies with the allocation limits 239 associated with the customer's characteristics or a default limit. For example, the network address management service 215 may determine a size of the first network address pool 251 based at least in part on one or more characteristics of the customer.

In box 309, the network address management service 215 may internally reserve a second network address pool 251 for the customer that is contiguous to the first network address pool 251. For example, the second network address pool 251 may correspond to internally reserved network address blocks 257 associated with the first network address pool 251. While the existence of the second network address pool 251 may be invisible or not requested by the customer, the second network address pool 251 is internally reserved for that customer such that the second network address pool 251 is not allocated to other customers. In some cases, the internal reservation of the second network address pool 251 may have an expiration after which the second network address pool 251 may be made available to other customers. For example, the network address management service 215 may determine a size of the second network address pool 251 based at least in part on one or more characteristics of the customer.

In box 312, the network address management service 215 advertises routing information for a network prefix including both the first network address pool 251 and the second network address pool 251. The routing information associates the network prefix to a specific cloud region 221 for routing purposes in some embodiments. The routing information may be propagated across the routers 218 as route advertisements 224. In some examples, the network prefix being advertised may encompass additional contiguous addresses that may be unallocated or allocated to other customers. For example, multiple contiguous address pools for different customers that are created in the same cloud region 221 may be aggregated together into a larger network prefix for advertisement. In addition, routes to the first network address pool 251 and the second network address pool 251 may be advertised as within a larger network prefix that corresponds to the cloud provider network.

Subsequently, the customer may utilize the network address management service 215 to allocate network address blocks 260 to different VPC networks 227. This usage of the network address management service 215 may be entirely self-service in nature, to allocate network address blocks having particular network prefix lengths to particular VPC networks 227. The customer may configure the sizes or prefix lengths of the network address block 260, which may differ for different VPC networks 227. The customer may also perform operations such as splitting a network address block 260, releasing the allocation of a network address block 260, combining two or more network address blocks 260 that are contiguous, and so forth.

In box 315, the network address management service 215 receives a request to create a network address pool 251 from the customer. For example, the request may be submitted by way of an API programmatically, or the request may be submitted by the customer through a user interface such as a command line interface or a graphical user interface using the client device 206. In some cases, the request may be to expand the first network address pool 251.

In box 318, the network address management service 215 expands the first network address pool 251 to include the second network address pool 251 that was internally reserved in advance for the customer. In some cases, the second network address pool 251 may be insufficient to meet the request specified in box 315. In such a circumstance, a different network address pool 251 may be created and assigned to the customer. Thereafter, the operation of the portion of the network address management service 215 ends.

Figure 4:
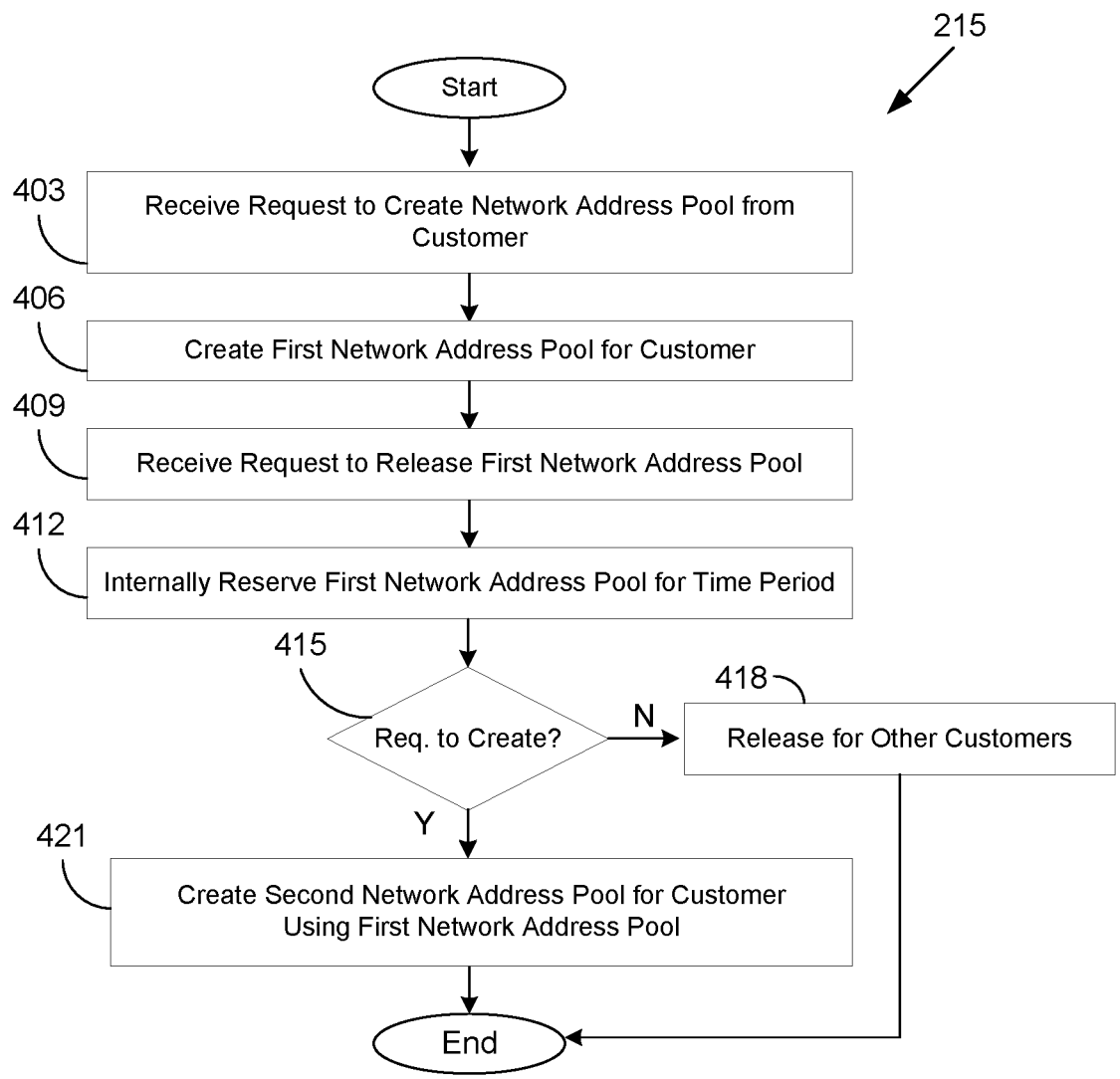
FIG. 4 is a flowchart illustrating one example of functionality implemented as portions of a network address management service executed in a computing environment in the networked environment of FIG. 2 according to various embodiments of the present disclosure.

Referring next to FIG. 4, shown is a flowchart that provides one example of the operation of another portion of the network address management service 215 according to various embodiments. It is understood that the flowchart of FIG. 4 provides merely an example of the many different types of functional arrangements that may be employed to implement the operation of the portion of the network address management service 215 as described herein. As an alternative, the flowchart of FIG. 4 may be viewed as depicting an example of elements of a method implemented in the computing environment 203 (FIG. 2) according to one or more embodiments.

Beginning with box 403, the network address management service 215 receives a request to create a network address pool 251 from a customer. For example, the request may be submitted by way of an API programmatically, or the request may be submitted by the customer through a user interface such as a command line interface or a graphical user interface using the client device 206. The request may specify a target cloud region 221 and/or the request may specify a desired size for the network address pool 251, for example, expressed in CIDR notation or network address prefix length.

In box 406, the network address management service 215 creates a first network address pool 251 for the customer. In creating the first network address pool 251, the network address management service 215 may ensure that the request complies with the allocation limits 239 associated with the customer's characteristics or a default limit.

In box 409, the network address management service 215 may receive a request from the customer to release all or a portion of the first network address pool 251. By releasing the first network address pool 251, the customer indicates an intention not to use the first network address pool 251 for allocating the network address blocks 260 included within the first network address pool 251. In some embodiments, the network address management service 215 may be configured to enforce a minimum size for the portion of the first network address pool 251 to be released. This may prevent address space fragmentation that would otherwise occur if a relatively small amount of address space is released for other customers.

In box 412, the network address management service 215 internally reserves the first network address pool 251 that has been requested to be released for a time period corresponding to the cooling time period. The cooling time period may be determined based at least in part on the cooling period configuration 242. For example, the cooling time period may be determined based at least in part on one or more customer characteristics from the customer data 236. The first network address pool 251 is internally reserved for the customer for potential reallocation to the customer.

In box 415, the network address management service 215 determines whether a request to create another network address pool 251 is received from the customer within the time period. If no such request is received within the time period, the network address management service 215 moves from box 415 to box 418 and releases the first network address pool 251 for assignment to one or more other customers. Thereafter, the operation of the portion of the network address management service 215 ends.

If instead a request to create another network address pool 251 is received within the time period, the network address management service 215 instead moves from box 415 to box 421 and creates a second network address pool 251 for the customer using all or a portion of the first network address pool 251. It is noted that the second network address pool 251 may be created using a different network prefix length or size than the first network address pool 251, and this prefix length or size may be specified in the creation request. In this way, the cloud provider network avoids a customer being able to cycle through many different ranges of network addresses. Further, the cloud provider network also avoids the possibility that data traffic may be misrouted due to the reassignment of the underlying network addresses and inconsistency of routing tables. Thereafter, the operation of the portion of the network address management service 215 ends.

Figure 5:
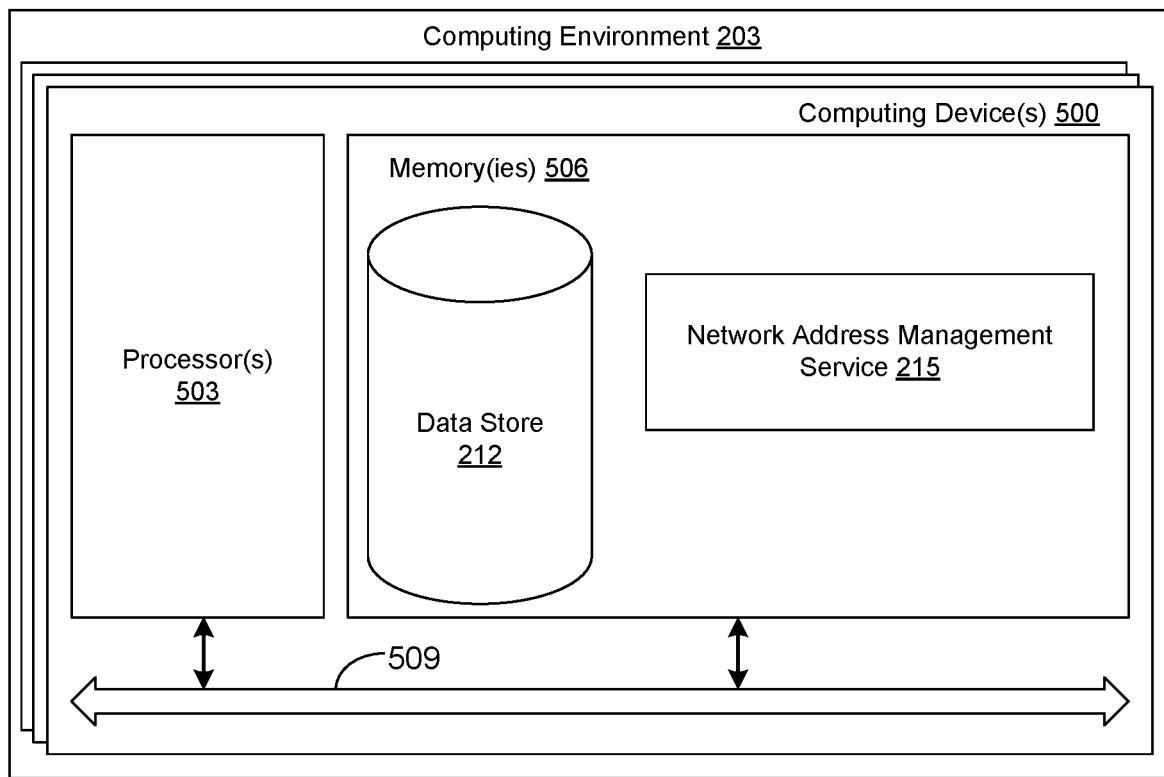
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the network address management service 215, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, universal serial bus (USB) flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although network address management service 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the network address management service 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network address management service 215, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network address management service 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a cloud provider network comprising a plurality of regions; and
    at least one computing device implementing a self-service network address allocation service configured to at least:
        create a first network address pool for a customer of the cloud provider network in response to a first request, the first request specifying a particular region of the plurality of regions;
        internally reserve a second network address pool for the customer, the second network address allocation being contiguous to the first network address pool;
        advertise routing information for a network prefix including the first network address pool and the second network address pool, the routing information indicating that the network prefix is routed to the particular region; and
        expand the first network address pool to include at least a portion of the second network address pool in response to a second request.

2. The system of claim 1, wherein the first network address pool and the second network address pool comprise contiguous internet protocol version 6 (IPv6) addresses or internet protocol version 4 (IPv4) addresses registered to the cloud provider network.

3. The system of claim 1, wherein the self-service network address allocation service is further configured to at least determine a size of the second network address pool based at least in part on one or more characteristics of the customer.

4. The system of claim 1, wherein the self-service network address allocation service is further configured to at least:
    receive an allocation request for the customer specifying a particular network prefix length; and
    allocate a network address block having the particular network prefix length from the first network address pool to a virtual private cloud network of the customer in the cloud provider network.

5. The system of claim 4, wherein the self-service network address allocation service is further configured to at least:
    split the network address block into a first network address block and a second network address block in response to a split request; and
    allocate the first network address block and the second network address blocks to different virtual private cloud networks of the customer.

6. The system of claim 1, wherein the self-service network address allocation service is further configured to at least:
    receive a request to release the first network address pool; and
    internally reserve the first network address pool for the customer for potential reallocation to the customer for a time period before releasing the first network address pool.

7. A computer-implemented method, comprising:
- creating a first network address pool for a customer of a cloud provider network in response to a first request;
- internally reserving a second network address pool for the customer, the second network address pool being contiguous to the first network address pool; and
- expanding the first network address pool to include at least a portion of the second network address pool in response to a second request.

8. The computer-implemented method of claim 7, further comprising advertising routing information for a network prefix including the first network address pool and the second network address pool before receiving the second request.

9. The computer-implemented method of claim 8, wherein the routing information indicates that the network prefix is routed to a particular region of a plurality of regions of the cloud provider network, the particular region being specified by the customer in the first request.

10. The computer-implemented method of claim 7, further comprising:
- receiving a third request to release the first network address pool; and
- internally reserving the first network address pool for the customer for a predetermined time period.

11. The computer-implemented method of claim 10, further comprising releasing the first network address pool to be allocated to another customer after the predetermined time period.

12. The computer-implemented method of claim 10, further comprising:
- during the predetermined time period, receiving a fourth request to create a third network address pool for the customer; and
- creating the third network address pool from the first network address pool in response to the fourth request.

13. The computer-implemented method of claim 7, further comprising allocating a first network address block from the first network address pool to a first virtual private cloud network of the customer in response to an allocation request, the allocation request indicating a requested network prefix length for the first network address block.

14. The computer-implemented method of claim 13, further comprising splitting the first network address block into a second network address block and a third network address block in response to a split request.

15. The computer-implemented method of claim 14, further comprising allocating the second network address block and the third network address block to different virtual private cloud networks of the customer in the cloud provider network.

16. A computer-implemented method, comprising:
- creating a first network address pool for a customer of a cloud provider network in response to a first pool creation request;
- receiving a request to release the first network address pool;
- internally reserving the first network address pool for the customer for a time period; and
- creating a second network address pool for the customer from the first network address pool in response to a second pool creation request received during the time period.

17. The computer-implemented method of claim 16, wherein the second pool creation request specifies a different network prefix length than the first pool creation request.

18. The computer-implemented method of claim 16, further comprising determining the time period based at least in part on one or more characteristics of the customer.

19. The computer-implemented method of claim 16, further comprising allocating a first portion of the second network address pool to a first virtual private cloud network of the customer in response to a first allocation request.

20. The computer-implemented method of claim 19, further comprising allocating a second portion of the second network address pool to a second virtual private cloud network of the customer in response to a second allocation request.

* * * * *